(12) United States Patent
Lee et al.

(10) Patent No.: US 7,361,864 B2
(45) Date of Patent: Apr. 22, 2008

(54) COMBINED TOASTER AND MICROWAVE OVEN

(75) Inventors: Jong Woog Lee, Changwon-si (KR); Young Choi, Changwon-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/640,220

(22) Filed: Dec. 18, 2006

(65) Prior Publication Data

US 2007/0095821 A1    May 3, 2007

Related U.S. Application Data

(63) Continuation of application No. 10/659,402, filed on Sep. 11, 2003, now Pat. No. 7,170,039.

(30) Foreign Application Priority Data

| Sep. 11, 2002 | (KR) | ............... 2002-0054979 |
| Sep. 11, 2002 | (KR) | ............... 2002-0054982 |
| Nov. 18, 2002 | (KR) | ............... 2002-0071682 |

(51) Int. Cl.
*A47J 37/08* (2006.01)
*H05B 6/80* (2006.01)

(52) U.S. Cl. ............ 219/413; 219/680; 219/386; 99/385; 99/451

(58) Field of Classification Search ............ 219/680, 219/685, 725, 739, 756, 762, 763, 386, 413, 219/512; 99/385, 388, 391–393, 399–400, 99/402, 451, DIG. 14
See application file for complete search history.

(56) References Cited

U.S. PATENT DOCUMENTS

| 2,631,523 | A |   | 3/1953  | Olving |
| 3,986,444 | A | * | 10/1976 | Caudron ............ 99/391 |
| 5,642,657 | A |   | 7/1997  | Yeung et al. |
| 6,112,648 | A |   | 9/2000  | Origane |
| 2003/0042252 | A1 |   | 3/2003 | Back et al. |

FOREIGN PATENT DOCUMENTS

| CN | 1201378 A  | 12/1998 |
| CN | 1357710 A  | 7/2002  |
| EP | 1213948 A2 | 6/2002  |
| FR | 2739273    | 4/1997  |

(Continued)

*Primary Examiner*—Philip H Leung
(74) *Attorney, Agent, or Firm*—McKenna Long & Aldridge LLP (57) ABSTRACT

The present invention relates to a combined toaster and microwave oven having a function to cook food by using microwave and a function to bake bread. Accordingly, the present invention provides a combined toaster and microwave oven comprising: a body forming an appearance thereof; a cavity formed in the body, for accommodating objects to be cooked by using microwave; an electronic chamber provided at a portion inside the body and in which electronic parts for applying microwave into the cavity are installed; and a toaster. The toaster comprises: a toaster case provided in the front of the electronic chamber and having slits on both sides thereof; at least one tray assembly having means for receiving and ejecting bread and preventing the bread from slanting; and a heater assembly installed inside the toaster case, for heating the bread.

16 Claims, 10 Drawing Sheets

FOREIGN PATENT DOCUMENTS

| | | |
|---|---|---|
| JP | 46-19646 | 7/1971 |
| JP | 60-66717 A | 4/1985 |
| JP | 07-204105 A | 8/1995 |
| JP | 08-317867 A | 12/1996 |
| JP | 09-037962 A | 2/1997 |
| JP | 2002-235924 A | 8/2002 |
| KR | 181833 | 5/1999 |

\* cited by examiner

COMBINED TOASTER AND MICROWAVE OVEN

This application is a Continuation of Application Ser. No. 10/659,402 filed on Sep. 11, 2003, now U.S. Pat. No. 7,170,039 which is hereby incorporated by reference as if fully set forth herein, which claims the benefit of Korean Patent Application No. 2002-0054979 filed in Korea on Sep. 11, 2002; Korean Patent Application No. 2002-0054982 filed in Korea on Sep. 11, 2002; and Korean Patent Application No. 2002-0071682 filed in Korea on Nov. 18, 2002, all of which are hereby incorporated by reference.

BACKGROUND OF THE INVENTION

1. Field of the Invention

The present invention relates to a toaster and a combined toaster and microwave oven, and more particularly, to a toaster having a means for preventing bread loaded therein from slanting and a combined toaster and microwave oven having the toaster.

2. Discussion of the Related Art

Generally, a microwave oven is an apparatus to cook food or melt frozen food by using microwave.

This microwave oven has been developed due to human desire to conveniently cook food within a short time in busy life. The conventional microwave oven will be now reviewed.

Figure 1:
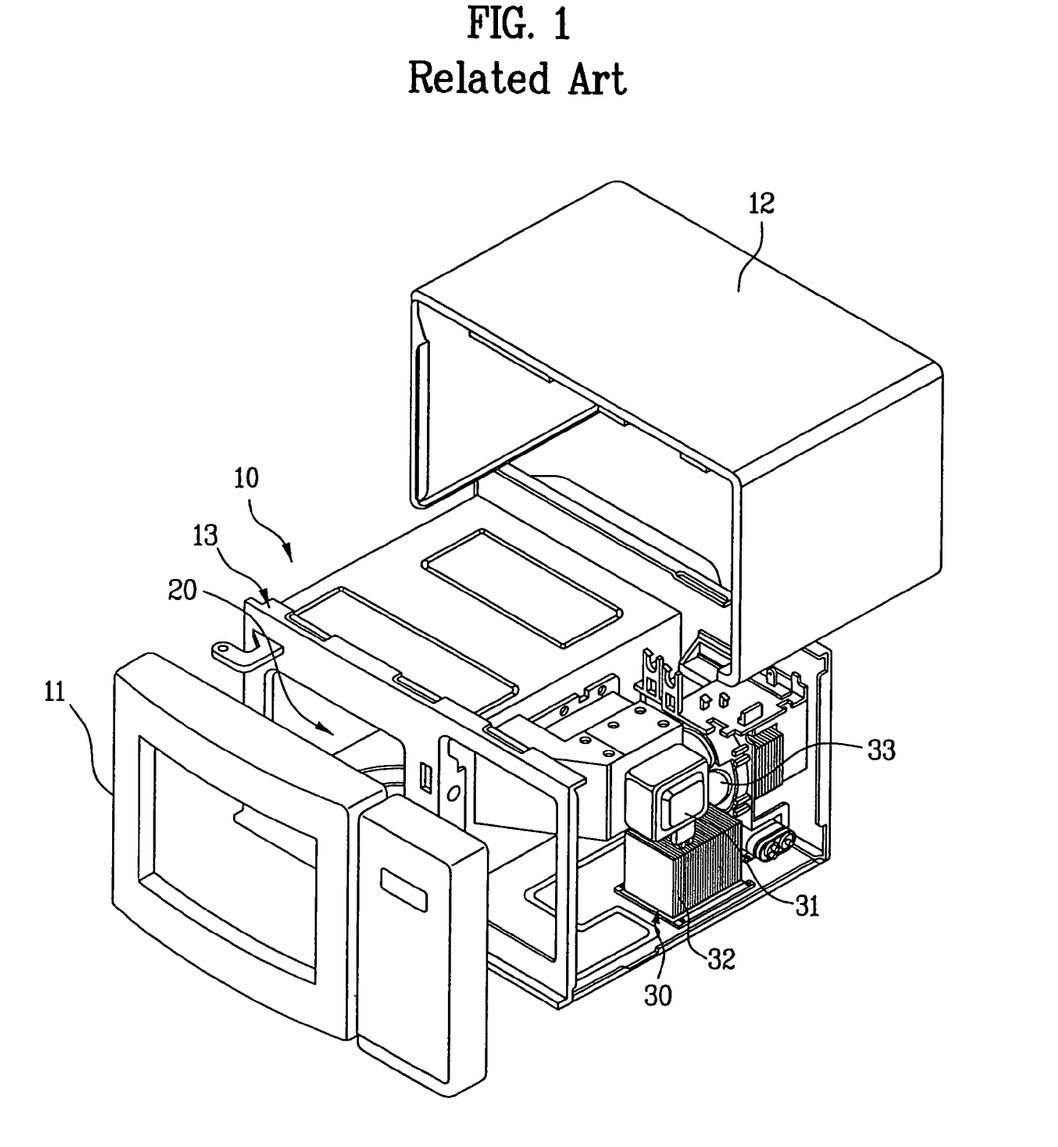
FIG. 1 is an exploded perspective view illustrating general configuration of a conventional microwave oven.

Referring to FIG. 1, a conventional microwave oven includes a body 10 forming its appearance, a cavity 20 formed in the body 10, for accommodating food, and an electronic chamber 30 which is provided at a portion inside the body and in which a variety of electronic parts for applying microwave into the cavity are installed.

Here, the body 10 generally includes a front case 11, an outer case 12 of the body 10, an outer frame 13 for maintaining the appearance of the microwave oven.

A cavity door (not shown) is installed in an opening of the front case so as to open and close the cavity.

Meanwhile, in the electronic chamber, installed are electronic components such as a magnetron 31 for generating microwave required to cook food, a transformer 32 for providing the magnetron 31 with high voltage, and a fan 33 for cooling electronic parts inside the body 10.

A general microwave oven having the above-mentioned construction is a cooking apparatus for applying microwave to cooking objects to cook. The general microwave oven is suitable to cook general food but not suitable for bread baking.

Also, the general toaster has a problem in that a piece of bread received therein slants to one side of the toaster and thus both sides of the piece of bread are not uniformly baked.

To solve the problem, it has been continuously required to develop a microwave oven having a function to cook food by using microwave and a function to bake bread.

SUMMARY OF THE INVENTION

Accordingly, the present invention is directed to a toaster and a combined toaster and microwave oven that substantially obviate one or more problems due to limitations and disadvantages of the related art.

An object of the present invention is to provide a toaster and a combined toaster and microwave oven having a function to cook food by using microwave and a function to bake bread.

Another object of the present invention is to provide a toaster and a combined toaster and microwave oven to prevent a bread from slanting during baking the bread so that both surfaces of the bread can be baked uniformly.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a toaster and a combined toaster and microwave oven.

In an aspect of the present invention, a toaster comprises a toaster case having slits on both sides thereof; a heater assembly installed inside the toaster case, for heating bread; and at least one tray assembly for receiving and ejecting the bread and preventing the bread from slanting while receiving the bread.

The tray assembly comprises at least one tray for receiving the bread; a movable tray supporter provided at a lower portion of the tray and installed in the slits on both sides of the toaster case, for moving the tray; a receiving and ejecting apparatus for moving the tray supporter; and a holder part for fixing the received bread so as not to slant.

The holder part comprises a pair of holders each of which front lower portion is bent toward a front surface of the toaster case and rear portion is bent toward a rear surface of the toaster case, the pair of holders being installed on each tray.

The holder includes a front lower portion installed at the front surface of the toaster case movably left and right; and a rear portion installed at the rear surface of the toaster case fixedly.

The holder part further comprises a spring formed of a single bent wire and crossed at a predetermined location of both sides thereof so that both ends thereof are coupled with a front lower portion of each of the holders; and spacing means for spacing both sides of the spring from each other to enlarge distance between the holders when the bread is ejected.

The toaster case comprises a front plate which constitutes a front surface with which a front bent portion of the holder is coupled and at which an insertion slot of the bread is formed.

The front plate has a coupling hole of a predetermined size on a lower portion thereof so that the bent portion of the front lower portion of the holder is installed.

The holder includes a heatproof and lubricant tube which surrounds a front bent portion, for contacting with the coupling hole of the front plate.

Unlike the configuration described above, the tray assembly may comprise at least one tray for preventing the bread from slanting while toasting the bread; a movable tray supporter fixed at a lower portion of the tray so as to receive and eject the bread; and a receiving and ejecting apparatus for moving the tray supporter.

The tray comprises a base for receiving the bread; and a supporter including a wing slanting from a rear surface of the bread by a predetermined angle, for supporting the rear portion of the bread and supporting both surfaces of the bread to prevent the bread from slanting.

The base comprises a wing slanting from a received surface of the bread by a predetermined angle, for supporting both surfaces of the lower portion of the bread on the both longer sides and supporting both surfaces of the bread to prevent the bread from slanting.

In another aspect of the present invention, a toaster comprises a toaster case having slits on both sides thereof; at least one tray assembly including at least one tray having the base provided with a wing slanting from a received surface of bread by a predetermined angle so as to receive the bread and support both surfaces of the lower portion of the bread, and a supporter provided with a wing slanting from a rear surface of the bread by a predetermined angle so as to support the rear portion of the bread and support both surfaces of the bread to prevent the bread from slanting; a heater assembly installed inside the toaster case, for heating the received bread; and a toaster door installed on a front portion of the front plate.

The tray assembly comprises a movable tray supporter provided at a lower portion of the tray so as to receive and eject the bread; a receiving and ejecting apparatus for moving the tray supporter; and a holder part for fixing the received bread so as not to slant.

The holder part comprises a pair of holders each of which front lower portion is bent toward a front surface of the toaster case and rear portion is bent toward a rear surface of the toaster case, the pair of holders being installed on each tray.

In an aspect of the present invention, a combined toaster and microwave oven comprises a body forming an appearance thereof; a cavity formed in the body, for accommodating objects to be cooked by using microwave; an electronic chamber provided at a portion inside the body and in which electronic parts for applying microwave into the cavity are installed; and a toaster.

The toaster comprises a toaster case provided in the front of the electronic chamber and having slits on both sides thereof; at least one tray assembly having means for receiving and ejecting bread and preventing the bread from slanting; and a heater assembly installed inside the toaster case, for heating the bread.

In another aspect of the present invention, a combined toaster and microwave oven comprises a body forming an appearance thereof; a cavity formed in the body, for accommodating objects to be cooked by using microwave; an electronic chamber provided at a portion inside the cavity and in which electronic parts for applying microwave into the cavity are installed; and a toaster.

The toaster comprises a toaster case provided in the front of the electronic chamber and having slits on both sides thereof; at least one tray assembly having a holder part installed in a slit of the toaster case for receiving and ejecting the bread and fixing a front surface of the bread, and at least one tray for receiving the bread and supporting both surfaces of a rear of the bread so as not to slant; and a heater assembly installed inside the toaster case, for heating the bread.

The holder part comprises a pair of holders each of which front lower portion is bent toward a front surface of the toaster case and rear portion is bent toward a rear surface of the toaster case, the pair of holders being installed on each tray.

The holder part further comprises a spring formed of a single bent wire and crossed at a predetermined location of both sides thereof so that both ends thereof are coupled with a front lower portion of each of the holders; and spacing means for spacing both sides of the spring from each other to enlarge distance between the holders when the bread is ejected.

The toaster case comprises a front plate which constitutes a front surface with which a front bent portion of the holder is coupled and at which an insertion slot of the bread is formed.

The front plate has a coupling hole of a predetermined size on a lower portion thereof so that a portion bent toward the front lower portion of the holder is installed.

The holder includes a heatproof and lubricant tube which surrounds a front bent portion, for contacting with the coupling hole of the front plate.

Owing to the combined toaster and microwave oven configured as described above, it is not required to buy any toaster separately besides a microwave oven and it is prevented that the bread is baked nonuniformly.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In general, a microwave oven is a cooker to cook food by using microwave or melt frozen food.

This microwave oven is an apparatus for modern people to cook food more conveniently in short time. Now, a microwave oven having various functions as well as the function of cooking food is required.

In response to the requirement, the toaster and microwave oven was devised.

The entire configuration of the present invention with a function to bake bread in a conventional microwave oven will be described referring to FIGS. 2 and 3.

Figure 2:
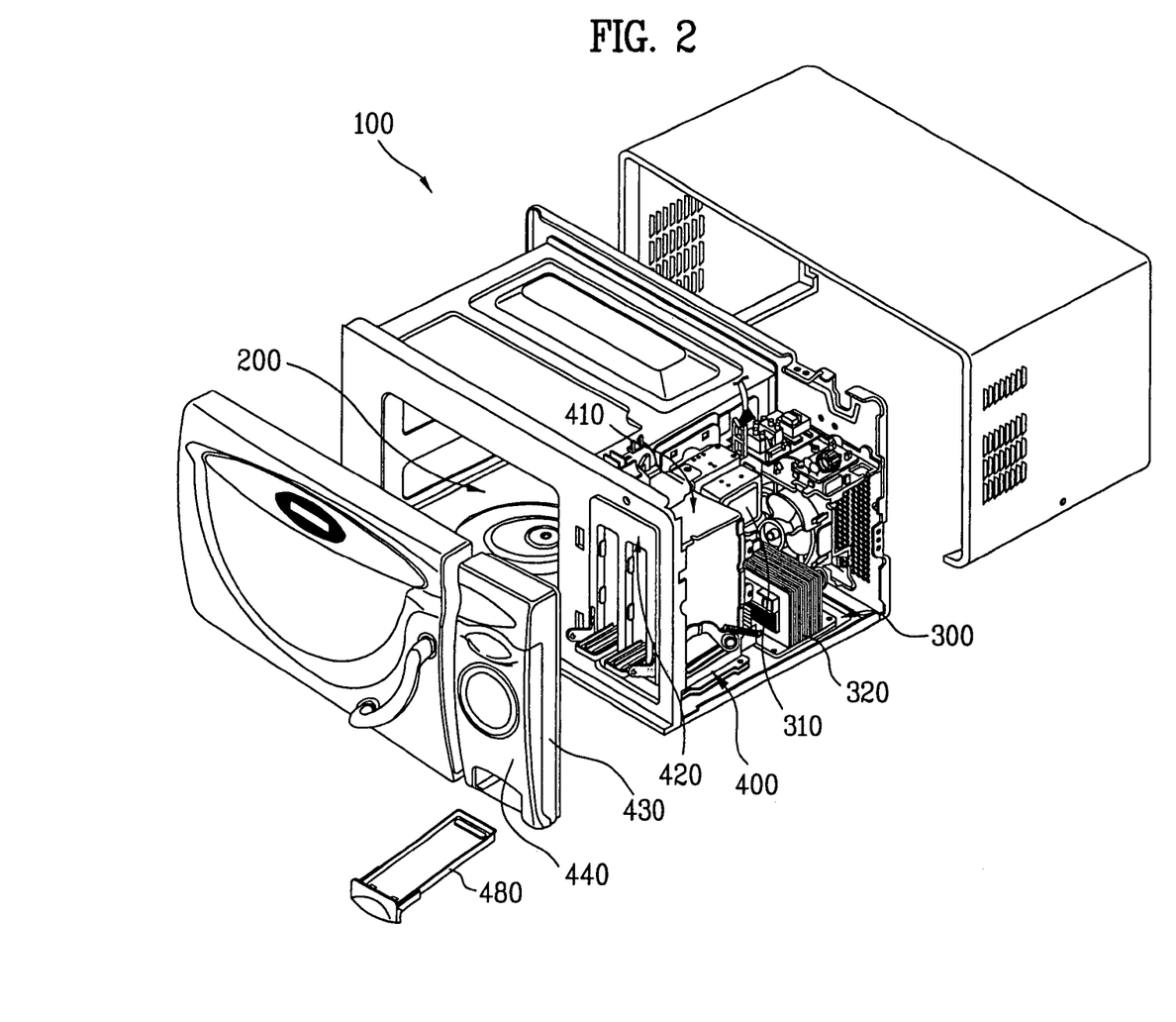
FIG. 2 is an exploded perspective view illustrating a combined toaster and microwave oven according to the present invention.
Figure 3:
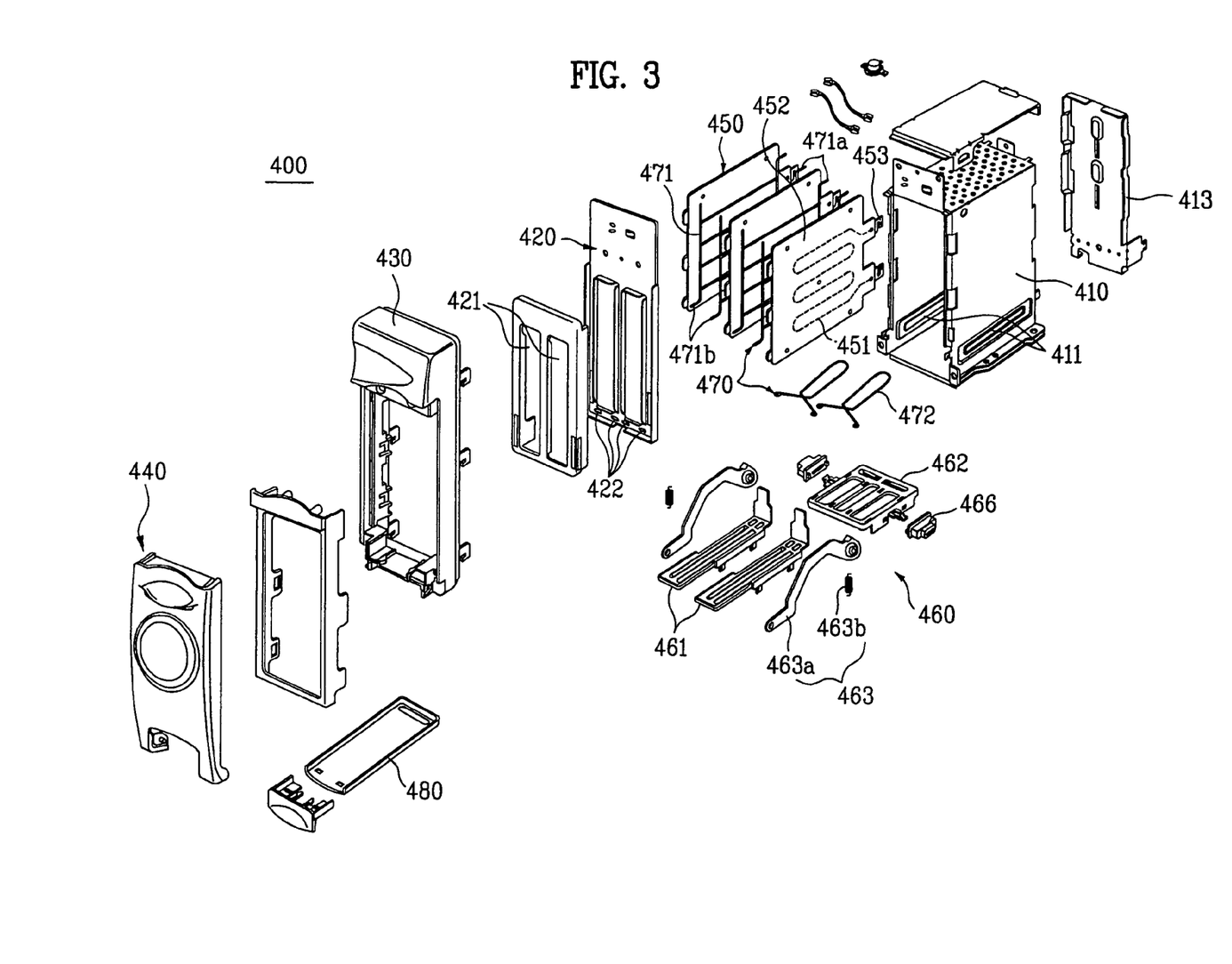
FIG. 3 is an exploded perspective view illustrating a toaster part of the combined toaster and microwave oven according to the present invention.

FIG. 2 is an exploded perspective view illustrating a combined toaster and microwave oven according to the present invention. Referring to FIG. 2, the configuration of the combined toaster and microwave oven of the present invention will be described.

The combined toaster and microwave oven of the present invention comprises a body 100 forming an appearance thereof, a cavity 200 formed in the body 100, for accommodating objects to be cooked by using microwave, an electronic chamber 300 provided at a portion inside the body 100 and in which electronic parts for applying microwave into the cavity 200 are installed, and a toaster 400.

The cavity 200 is a space to receive and cook food. Since the function and configuration of the cavity 200 is the same as the conventional microwave oven, the description of them will be omitted. The size of the space depends on the usage purposes.

In the electronic chamber 300, installed are various electronic components such as a magnetron 310 for generating microwave to cook food, a transformer 320 for providing the magnetron 310 with high voltage, and a fan 330 for cooling the electronic parts to get rid of heat generated when cooking.

Preferably, the toaster 400 is installed in the front of the electronic chamber 300.

Since the various electronic components and the toaster are installed in a space of the limited body of the combined toaster and microwave oven of the present invention, a lot of heat is generated compared with the conventional microwave oven. Accordingly, to cool the inside of the body, it is desired that the cooling efficiency is improved by means of the manner to get revolution of the cooling fan of the body higher.

Then, the configuration of the toaster will be described referring to FIGS. 2 and 3.

The toaster includes a toaster case 410, a front plate 420, a front panel 430, a toaster door 440, a door locker (not shown), a power supply (not shown), a heater assembly 450 and a tray assembly 460.

The toaster case 410 has a front open surface and a space inside such that it forms a whole appearance of the toaster. A slit is formed on both sides of the lower portion of the toaster case 410. The slit is formed thin and long in a back and forth direction of the toaster case 410. A rear plate 413 is installed on the rear portion of the toaster case 410 and a bread crusts receiver 480 is installed on the lower portion of the toaster case 410 so as to eject the bread.

The front plate 420 is coupled with a front surface of the toaster case 410 and has at least one insertion slot to insert the bread. In other words, the number of pieces of the bread to bake at once depends on the number of the insertion slots.

The front panel 430 is coupled with the front portion of the front plate 420, forms a front shape of the toaster and is formed of a rectangular body having an opening at its center.

Preferably, the front panel further includes a thermal insulating film to prevent the heat of the heater assembly 450 from transmitting to the toaster door and the front panel themselves.

The toaster door 440 is hinged to the front panel by a hinge portion so as to open and close the opening of the toaster case 410. Here, the hinge portion is installed on the lower portion of the toaster door.

The heater assembly 450 is installed inside the toaster case 410. Here, the heater assembly 450 includes a separating wall 452 for separating regions inside the toaster case, a heat line 451 embedded in the separating wall 452, for generating heat when electric power is supplied, and a terminal 453 for supplying the heat line 451 with the electric power.

The number of regions defined by the separating walls is the same as the number of the pieces of the bread to be baked. This is the same as the number of the insertion slots formed on the front plate.

The tray assembly 460 includes at least one tray 461, a tray supporter 462, a receiving and ejecting apparatus 463 and a holder part 470.

The tray 461 receives the bread. The tray 461 receives the bread into the toaster case and ejects the bread from the toaster case. The configuration of the tray 461 will be described in detail. The tray 461 includes a base 461*a* to receive the bread and a supporter 461*b* to supporting the rear surface of the bread.

A projection 462*a* is formed on both sides of the tray supporter 462. The projection 462*a* is inserted into the slit formed on the toaster case 410 and installed and a bushing 466 is installed there.

The bushing 466 guides a moving path of the tray supporter 462 when each slit 411 formed on the toaster case is exposed to the exterior. Here, the bushing 466 is preferably made of heatproof synthetic resin such as Teflon material and the like.

The receiving and ejecting apparatus 403 has a couple of connection levers having an end connected to the projection of the tray supporter 462 and the other end connected to the toaster door, and a couple of springs 463*b* having an end connected to the tray supporter 462 and the other end fixed to a rear plate 413 installed on a rear portion of the toaster case 410.

More detailed, when the toaster door 440 is closed, the connection portion of the toaster door 440 connected to the end of the connection lever 463*a* is placed higher than the connection portion of the tray supporter 462 connected to the other end of the connection lever 463*a*. On the other hand, when the toaster door is open, the end of the connection lever 463*a* connected to the toaster door is placed lower than or same as the other end of the connection lever 463*a*.

Here, the receiving and ejecting apparatus may have the configuration in which the bread is received and ejected by the toaster door as the mentioned configuration and also may have the configuration in which the bread is automatically ejected by restoration force of the spring since a locker is released when the bread is baked completely. In other words, the above-mentioned configuration is merely an example of the receiving and ejecting apparatus.

On the other hand, the toaster has a configuration in which the bread is received and ejected at the front surface but it may have the configuration in which the bread is received and ejected at the upper surface.

Then, the concrete embodiment and the operation of the tray assembly will be described referring to FIGS. 4, 5, 6, 7, and 8. Since the remaining configuration except for the tray assembly 460 is as the same as described above, the description of the remaining configuration will be omitted.

As described above, the tray assembly includes at least one tray 461, a tray supporter 462, a receiving and ejecting apparatus 463, and a holder part 470.

The tray 461 receives the bread and is installed on the upper portion of the tray supporter 462. When the tray supporter moves, the tray 461 moves together. The tray 461 is installed inside the toaster case 410, more particularly, between a couple of separating walls provided to the heater assembly 450.

Figure 4A:
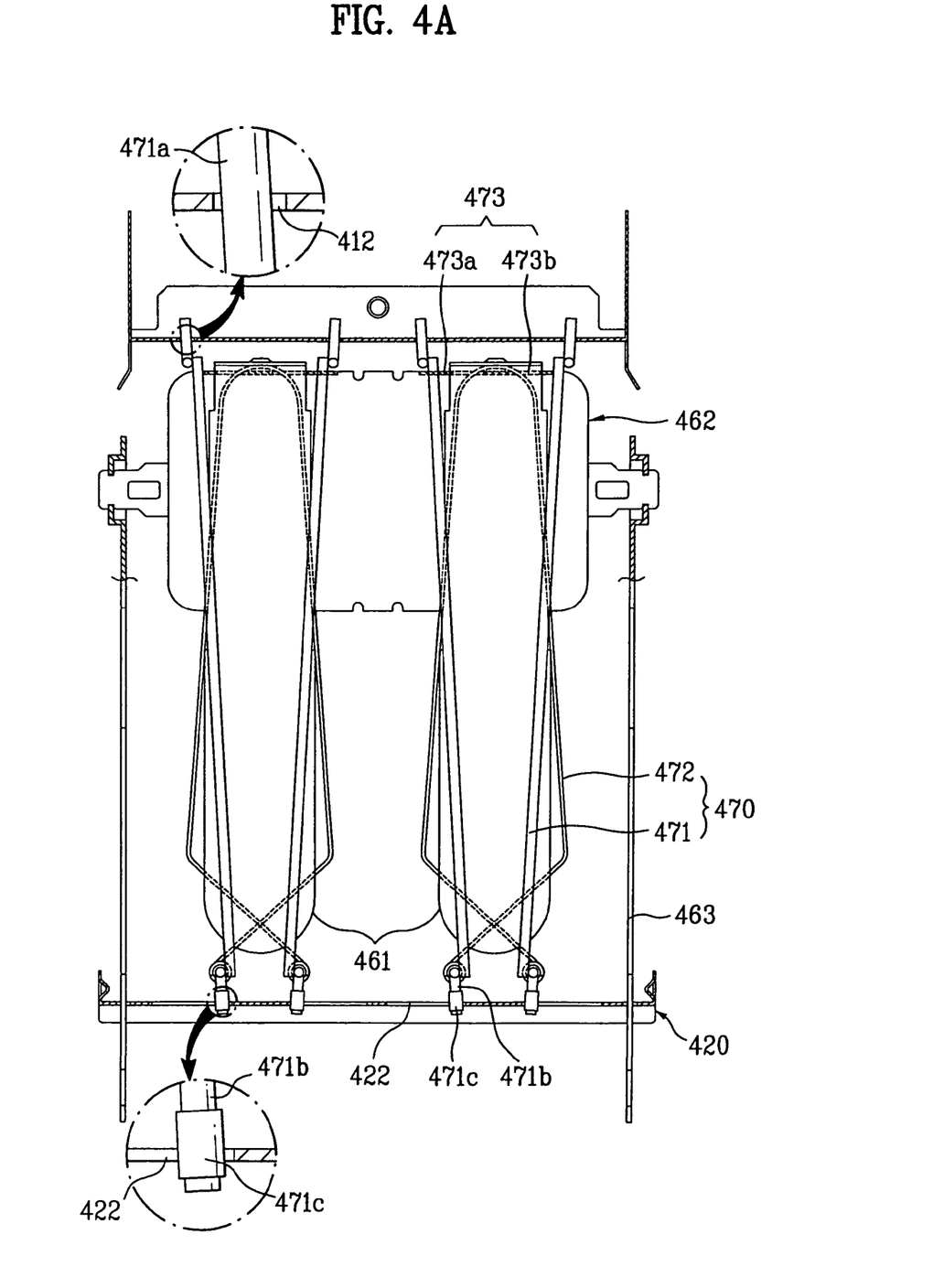
FIGS. 4A and 4B are plain views illustrating operation of a tray assembly of the toaster part of the combined toaster and microwave oven according to the present invention.
Figure 4B:
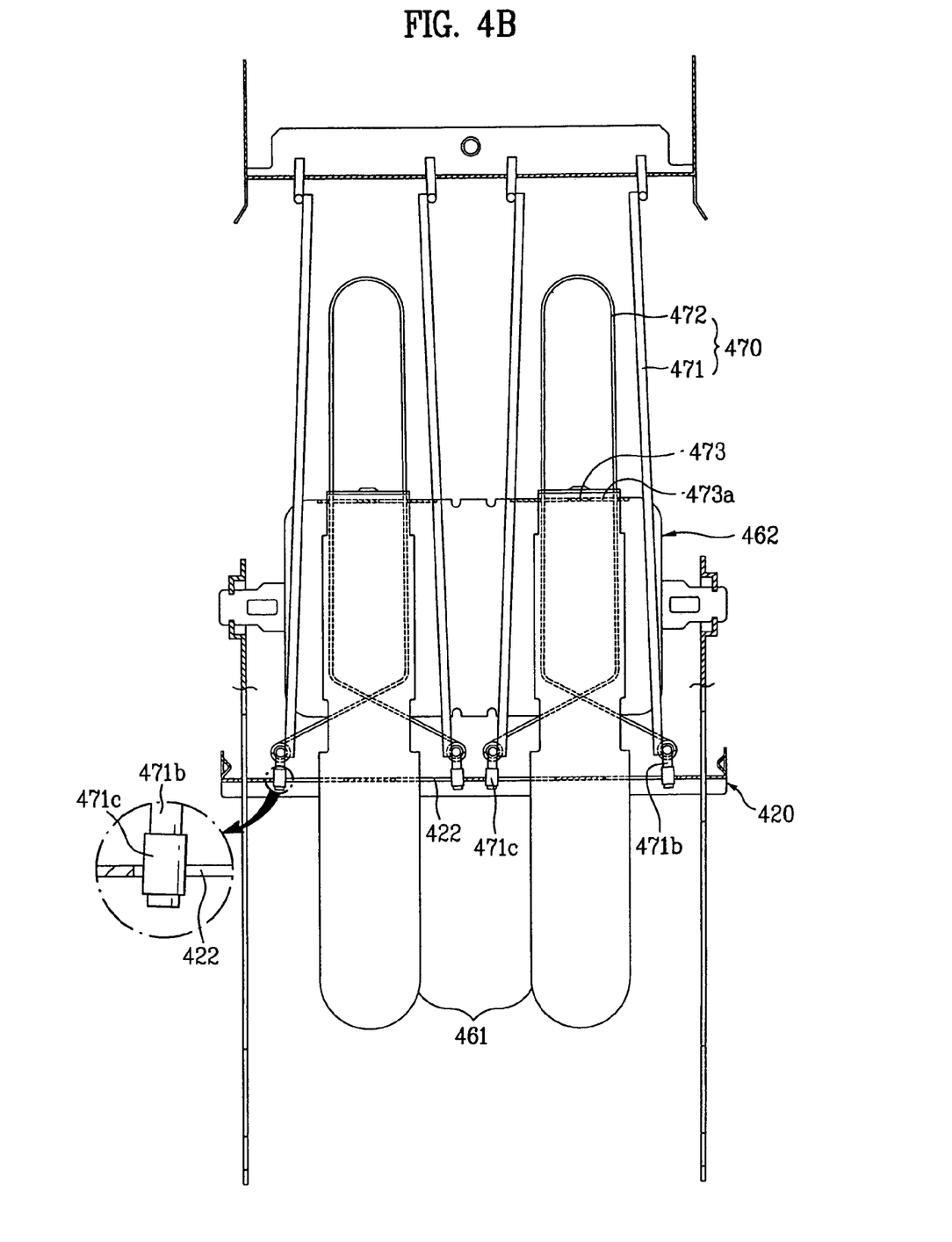

Referring to FIG. 4, the holder part 470 is configured to include a pair of holders 471 installed for each tray 461. The holders 471 are installed inside the toaster case to function to fix the received bread. Each of the holders 471 has a front lower portion which the bread is received in and which is bent toward the front surface of the toaster case 410, and a rear portion which is bent toward the rear surface of the toaster case.

Here, the front lower portion 471b of the holder 471 is installed movably left and right on the lower portion of the front plate 420 coupled with the front surface of the toaster case. The rear portion 471a of the holder is fixedly installed on the rear portion of the toaster case, more preferably, on the rear plate 413.

A coupling hole 422 having a predetermined size is further formed on the front plate 420 so that the front bent portion 471b of the holder 471 can move left and right when the bread is received and ejected.

A coupling hole 412 to which a rear bent portion 471 of the holder 471 is fixed is formed on the rear plate 413. The coupling hole is preferably installed on the upper and lower portions of the rear plate.

Figure 5A:
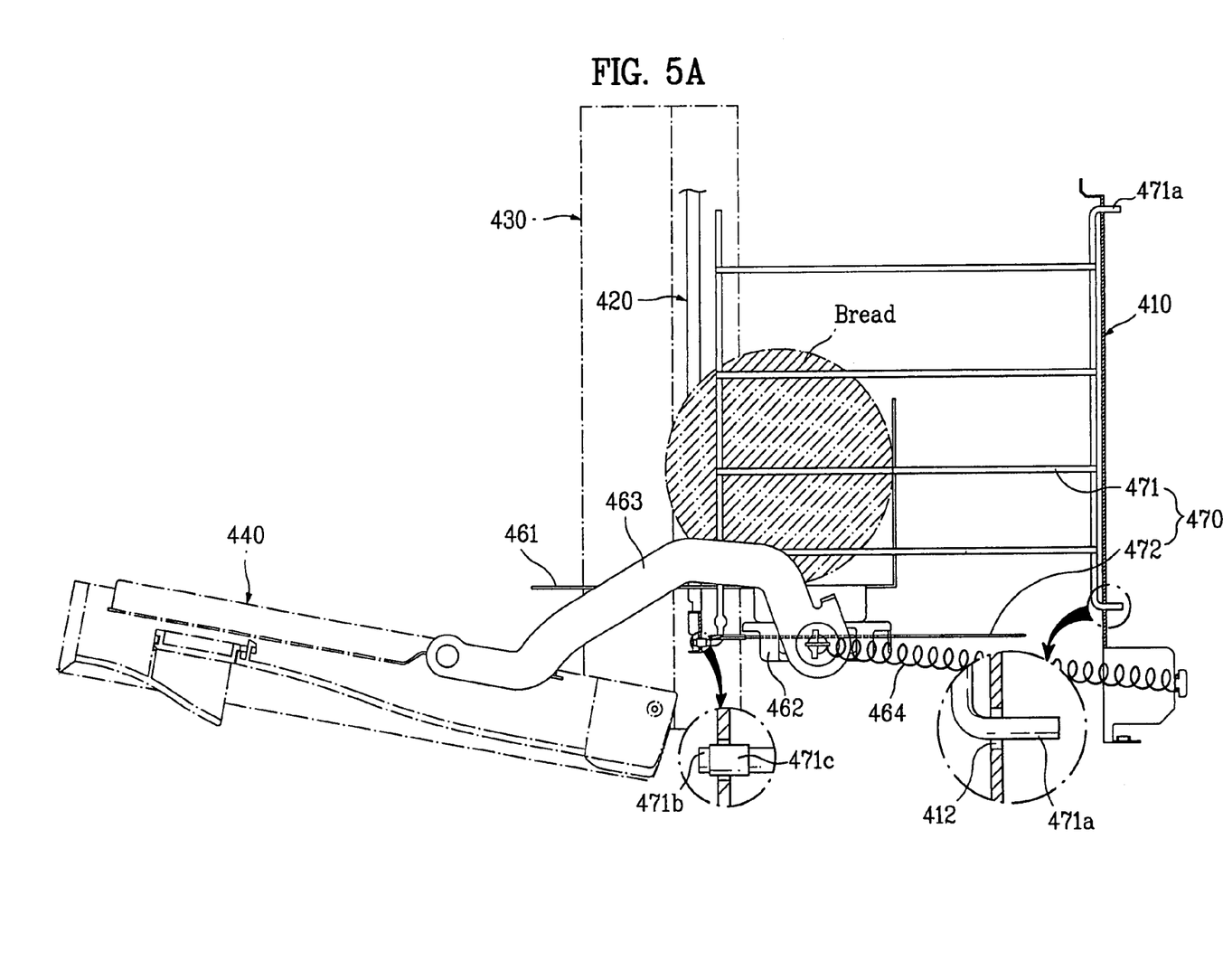
FIGS. 5A and 5B are side views illustrating operation of the tray assembly and a receiving and ejecting apparatus of the tray assembly of the toaster part of the combined toaster and microwave oven according to the present invention.
Figure 5B:
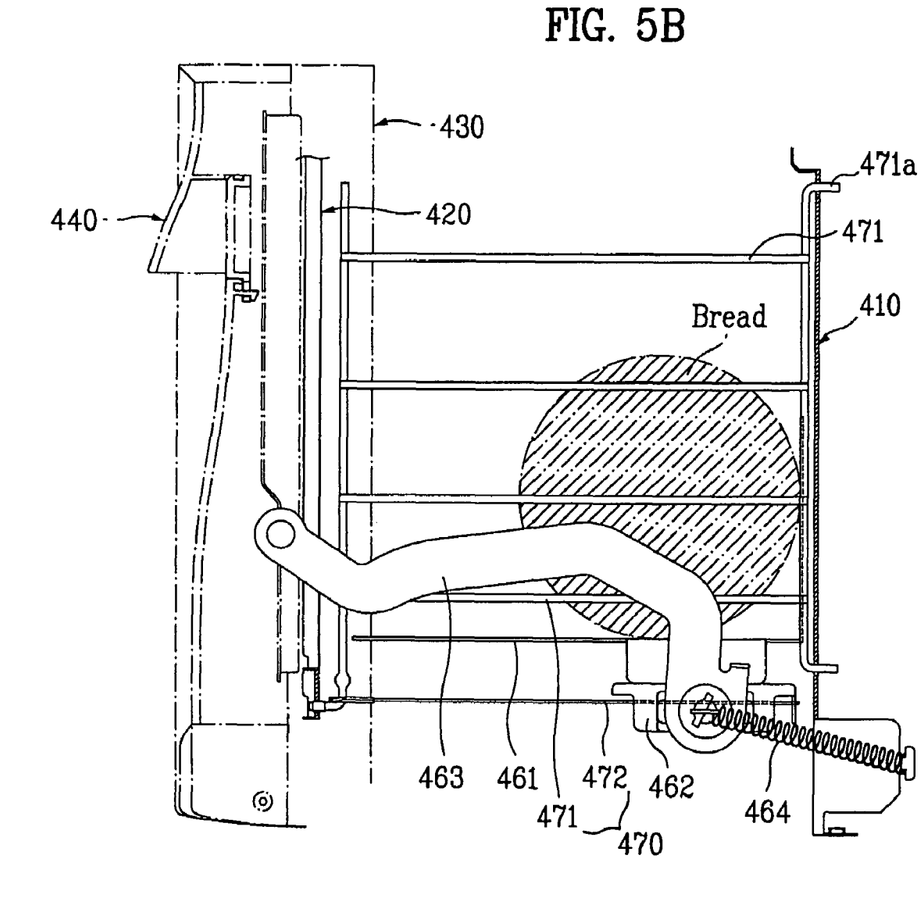

The holder 471 has a structure in which a plurality of pins are connected in a lattice or a line as shown in FIG. 5 and is preferably made of heatproof material.

The holder part further comprises an elastic spring 472 and a spacing means 473 for spacing both ends of the spring from each other to enlarge distance between the holders 471 when the bread is ejected.

It is desirable that the spring is formed of a single bent wire whose center portion is bent and crossed at a predetermined location of both sides thereof so that both ends thereof are coupled with a front lower portion of each of the holders 471.

Figure 6:
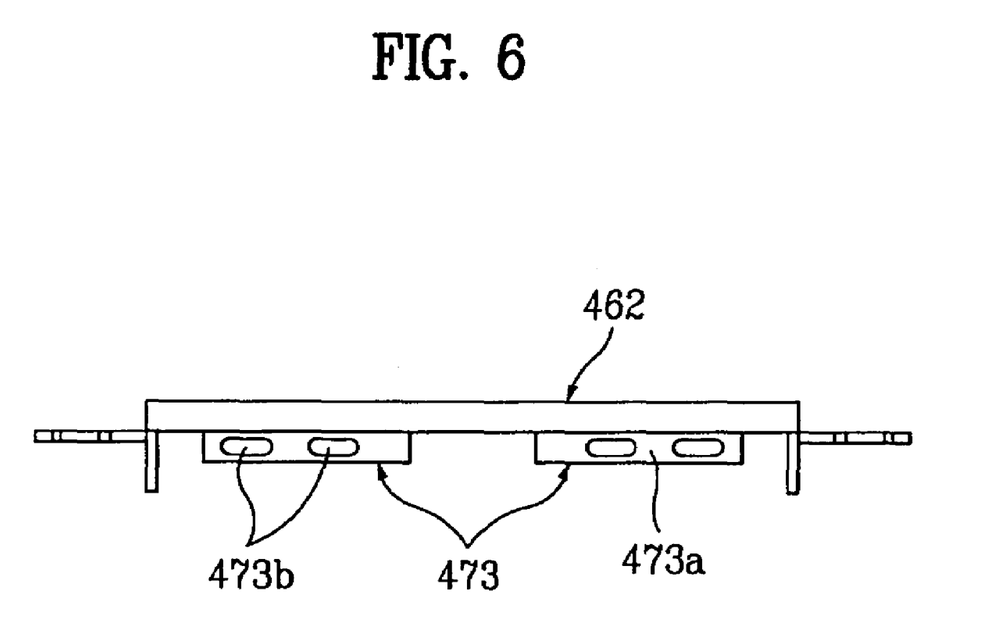
FIG. 6 is a plain view illustrating a tray supporter and a spacing means of a holder part constituting the tray assembly of the toaster part of the combined toaster and microwave oven according to the present invention.

Referring to FIG. 6, the spacing means 473 comprises a body 473a integrated with a rear lower portion of the tray supporter, and a through hole 473b through which both side of a bent portion of the spring pass.

Adding to the above-mentioned configuration, as shown in FIGS. 4A and 5A, it is preferable that the holder 471 further includes a heatproof tube surrounding a front bent portion 471b coupled and contacted with the front plate.

Since the tube 471c is moved left and right when the bread is received and ejected, the tube 471c is rubbed with the coupling hole 422 of the front plate. So, the tube 471c is preferably made of the material that is heatproof as described above and also lubricant.

On the other words, the material of the tube is desirably Teflon that is heatproof and very lubricant. Teflon is very available. However, Teflon is one of examples of the tube material and the material of the tube is not limited to Teflon. Ant material that is heatproof and very lubricant can be employed.

Unlike the above-mentioned structure, the tray assembly is configured as follows.

Here, the tray assembly 460 includes at least one tray 461 for preventing the bread from slanting while receiving the bread, a movable tray supporter 462 fixed at a lower portion of the tray so as to receive and eject the bread, and a receiving and ejecting apparatus 463 for moving the tray supporter.

Figure 7A:
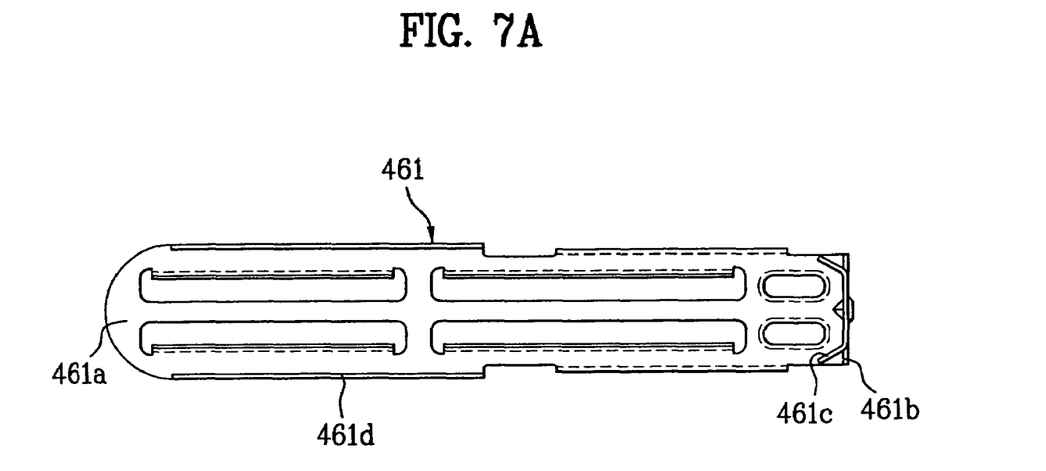
FIGS. 7A and 7B are a plain view and a side view illustrating another embodiment of the tray constituting the tray assembly of the toaster part of the combined toaster and microwave oven according to the present invention.
Figure 7B:
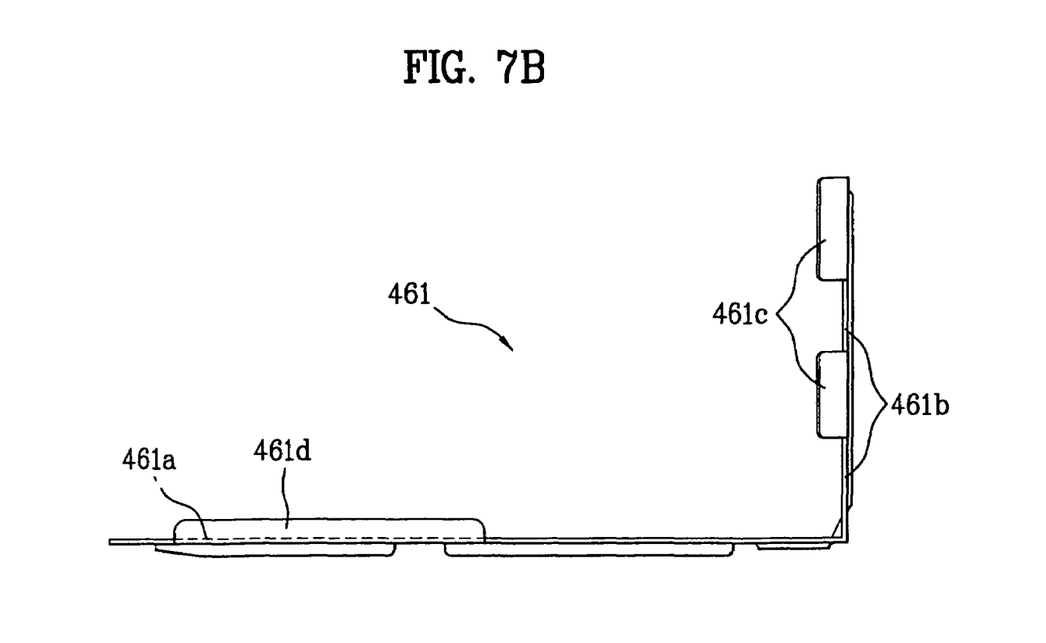

Described more detail referring to FIG. 7, the tray comprises a base 461a for receiving the bread, and a supporter 461b including a wing 461c slanting from a rear surface of the bread by a predetermined angle, for supporting the rear portion of the bread and supporting both surfaces of the bread to prevent the bread from slanting.

The base 461a desirably comprises a wing 461d slanting from a received surface of the bread by a predetermined angle, for supporting both surfaces of the lower portion of the bread on the both longer sides and supporting both surfaces of the bread.

The wing parts 461c and 461d of the base and the supporters preferably slant from a reference surface where the bread is received and supported and each wing is formed by 90-180°. If the slat angle is 90-180°, the bread can be prevented from slanting efficiently without any concern of the thickness of the bread.

Figure 8:
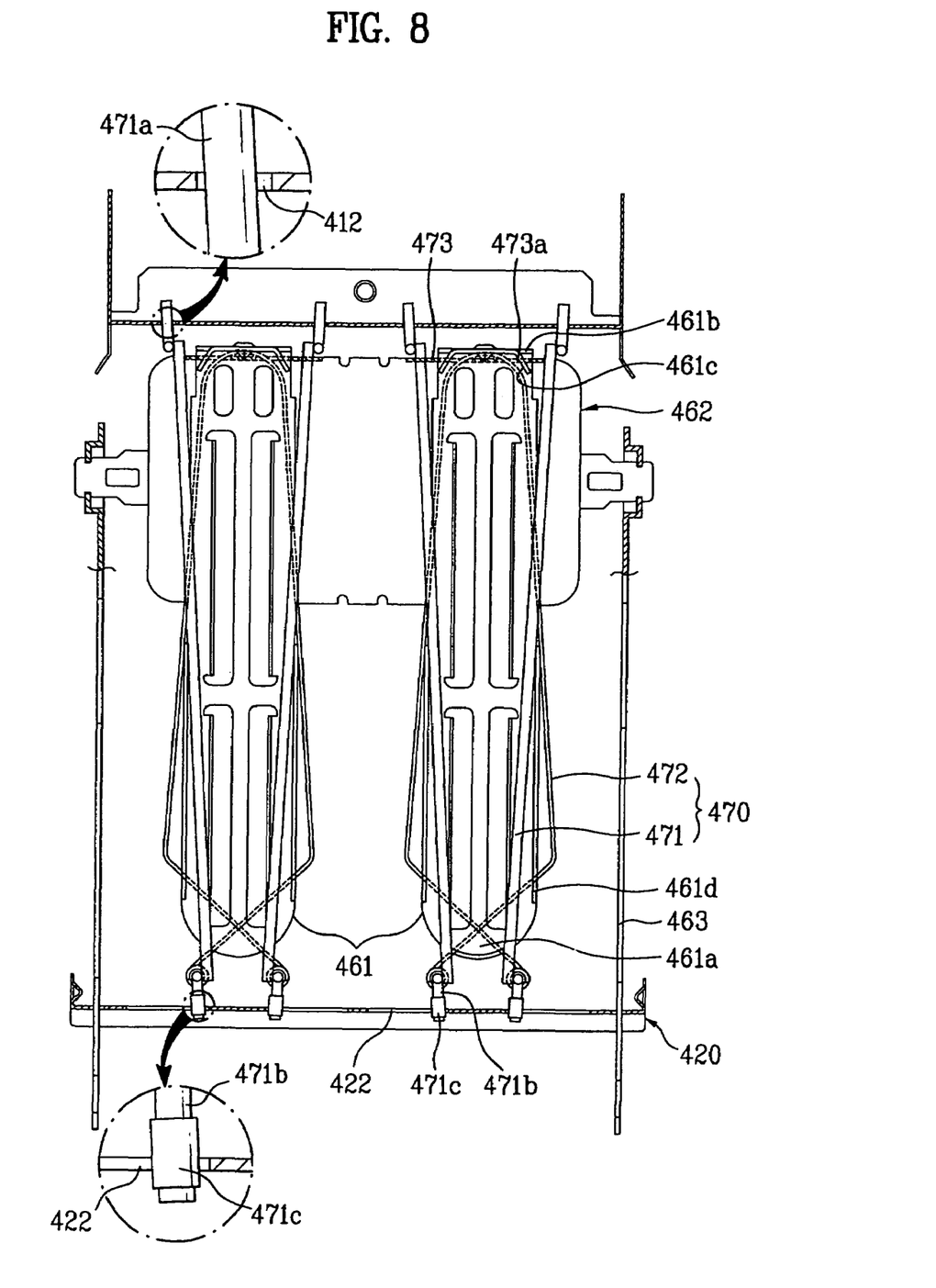
FIG. 8 is a plain view illustrating another embodiment of the tray assembly of the combined toaster and microwave oven according to the present invention.

As another embodiment, the tray assembly may include a tray having the wing part, and the holder part 470 as shown in FIG. 8. The holder preferably includes the tube at the end of a front bent portion.

If the above-mentioned configuration is employed, the bread received in the toaster case can be fixed more efficiently.

In more detail, since the wing part 461c formed on the supporter supports the rear portion of the received bread and the holder 471 fixes the front portion of the bread, the bread is received on the tray 461 stably so that the front and rear portions of the bread does not slant left and right. Even though the holder moves, the holder can move smoothly thanks to the tube installed on the end of the front bent portion of the holder.

The operation of the toaster of the combined toaster and microwave oven configured as described above will be described referring to FIGS. 4 and 5.

When a user bakes bread, the toaster door 440 is manipulated to open the front portion of the toaster case 410. Here, the connection lever 463 connected to the both sides of the toaster door 400 rotates and accordingly, the tray supporter 462 connected to the other end of the connection lever moves toward the toaster case.

In other words, each busing 466 of the tray supporter 462 is guided to move forward by each slit 411 formed on both side of the toaster case. Each tray 461 installed on the upper portion of the tray supporter 462 moves forwards. Some of them are exposed to exterior through the open front surface of the toaster case 410.

Here, the spacing means 473 of the holder part moves forwards along with the tray supporter 462 and make the width of the bent wire spring 472 narrower. To the contrary, the space between both ends of the wire spring 472 formed on the opposite side of the bent portion are widen from each other based on cross point of the wire spring 472.

The space between the front lower portions of the holder 471 connected to both ends of the wire spring 472 are widen from each other horizontally and the distance between a pair of holders 471 is enlarged. The state described above is illustrated in FIGS. 4A and 5A.

Then, after the user put the pieces of the bread on each open tray 461, if the toaster door 440 is closed, the tray supporter 462 is moved into the toaster case 410 owing to the restoration force of the spring 463*b* provided on the receiving and ejecting apparatus and the toaster door is closed due to rotation of the connection lever 463*a*. Accordingly, the bread is moved into the toaster case 410 and received on the cooking position.

In inserting the bread, the holder part 470 operates oppositely to the toaster door 440 opening. More particularly, the separating means 473 is moved backwards along with the tray supporter 462, and the wire spring 472 is restored to an original shape due to elasticity.

Therefore, the bent wire spring 472 is widened. Oppositely, the space between the both ends of the wire spring formed opposite to the bent portion gets narrow.

The space between a couple of the holders 471 connected to both ends of the wire is narrowed so the bread received on the cook location is fixed and the both sides of the bread are baked uniformly. It is illustrated in FIGS. 4B and 5B.

Then, when the electric power is supplied to the heater assembly, the bread is baked. When the toast door is opened, the bread is released from fixing state and ejected to exterior.

The present invention described above has effects as follow.

First, the combined toaster and microwave oven of the present invention adds a function to bake bread to the functions of the general conventional microwave oven so that it is not required to purchase a toaster and make the user use the microwave oven more frequently.

Next, the combined toaster and microwave oven of the present invention prevents the bread from slanting to one side so that the both side of the pieces of the bread is baked uniformly.

Since the combined toaster and microwave oven of the present invention includes a tube surrounding the front bent portion of the holder 471 for fixing the bread, fractious force between the coupling holes formed on the front lower portion of the holder and the front plate is minimized and the holder can move smoothly.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A toaster comprising:
   a toaster case having a front plate with slits on both sides thereof to receive items to be toasted;
   a heater assembly installed inside the toaster case, for heating the items to be toasted; and
   at least one tray assembly for receiving and ejecting the items to be toasted and preventing the items to be toasted from slanting while toasting the items to be toasted, the at least one tray assembly includes a pair of holders to hold an item to be toasted, wherein a front lower portion of each of the holders is installed on the front plate such that each of the holders are configured to move in left/right directions.

2. The toaster of claim 1, wherein the tray assembly comprises:
   at least one tray for receiving the item to be toasted;
   a movable tray supporter provided at a lower portion of the tray and installed in the slits on both sides of the toaster case, for moving the tray;
   a receiving and ejecting apparatus for moving the tray supporter; and
   a holder part for fixing the received item to be toasted so as not to slant.

3. The toaster of claim 2, wherein the holder part comprises the pair of holders each of which front lower portion is bent toward a front surface of the toaster case and rear portion is bent toward a rear surface of the toaster case, the pair of holders being installed on each tray.

4. The toaster of claim 3, wherein the holders are made of heatproof material and arranged in a line or a lattice.

5. The toaster of claim 3, wherein the rear portion of the holder is installed at the rear surface of the toaster case fixedly.

6. The toaster of claim 5, wherein the holder part further comprises:
   a spring formed of a single bent wire and crossed at a predetermined location of both sides thereof so that both ends thereof are coupled with a front lower portion of each of the holders; and
   spacing means for spacing both sides of the spring from each other to enlarge distance between the holders when the item to be toasted is ejected.

7. The toaster of claim 6, wherein the spacing means comprises:
   a body integrated with a rear lower portion of the tray supporter; and
   a through hole through which both sides of a bent portion of the spring pass.

8. The toaster of claim 7, wherein the toaster case comprises a front plate, which forms a front surface with which a front bent portion of the holder is coupled and at which an insertion slot of the item to be toasted is formed.

9. The toaster of claim 8, wherein the front plate has a coupling hole of a predetermined size on a lower portion thereof so that the bent portion of the front lower portion of the holder is installed.

10. The toaster of claim 9, wherein the toaster case further comprises a rear plate having a coupling hole to which a rear portion of the holder is fixed.

11. The toaster of claim 9, wherein the holder comprises a heatproof and lubricant tube which surrounds a front bent portion, for contacting with the coupling hole of the front plate.

12. The toaster of claim 8, further comprising a toaster door coupled with a front portion of the front plate.

13. The toaster of claim 12, wherein the receiving and ejecting apparatus comprises:
   a couple of connection levers having an end connected to the toaster door and the other end connected to the tray supporter; and
   a couple of springs having an end connected to the tray supporter and the other end connected to a rear portion of the toaster case.

14. The toaster of claim 1, wherein the tray assembly comprises:
   at least one tray for preventing the bread from slanting while toasting the bread;
   a movable tray supporter provided at a lower portion of the tray so as to receive and eject the bread; and
   a receiving and ejecting apparatus for moving the tray supporter.

15. The toaster of claim 14, wherein the tray comprises: a base for receiving the bread; and a supporter including a wing configured slanting from a rear supporting surface of the bread by a predetermined angle, for supporting the rear portion of the bread and supporting both surfaces of the bread to prevent the bread from slanting.

16. The toaster of claim 15, wherein the base comprises a wing formed with a predetermined angle from a receiving surface of the bread, for supporting both surfaces of the lower portion of the bread on the both longer sides and supporting both surfaces of the bread to prevent the bread from slanting.

* * * * *